Sheet 1.
2 Sheets.
D. P. Sharp.
Horse-Rake.
N° 51486      Patented Dec. 12, 1865.
Fig. 1.
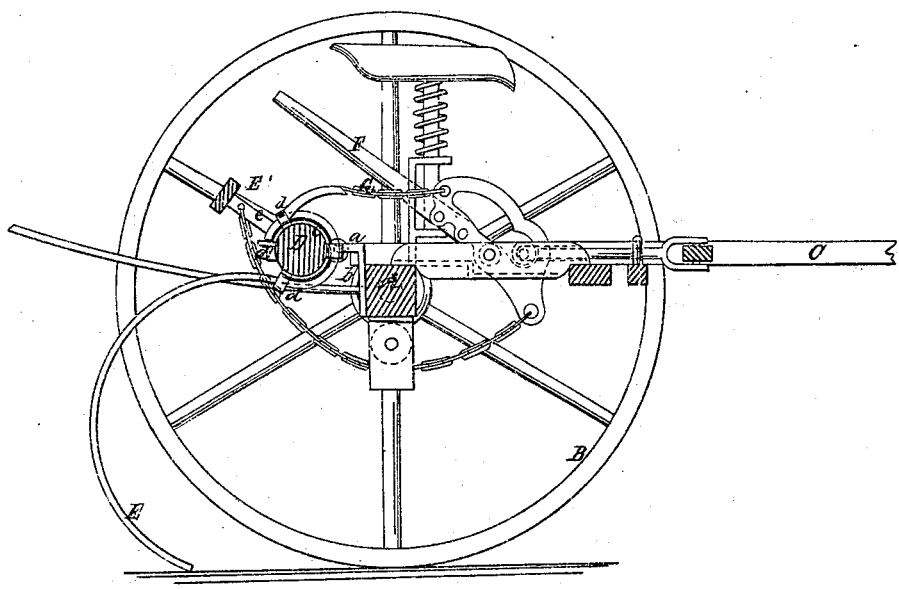
Fig. 3.      Fig. 4.
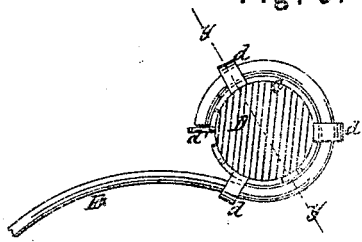 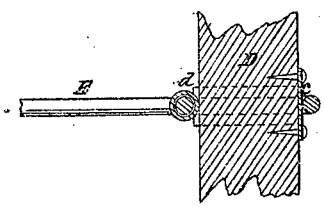
Witnesses.
Inventor.
D P Sharp

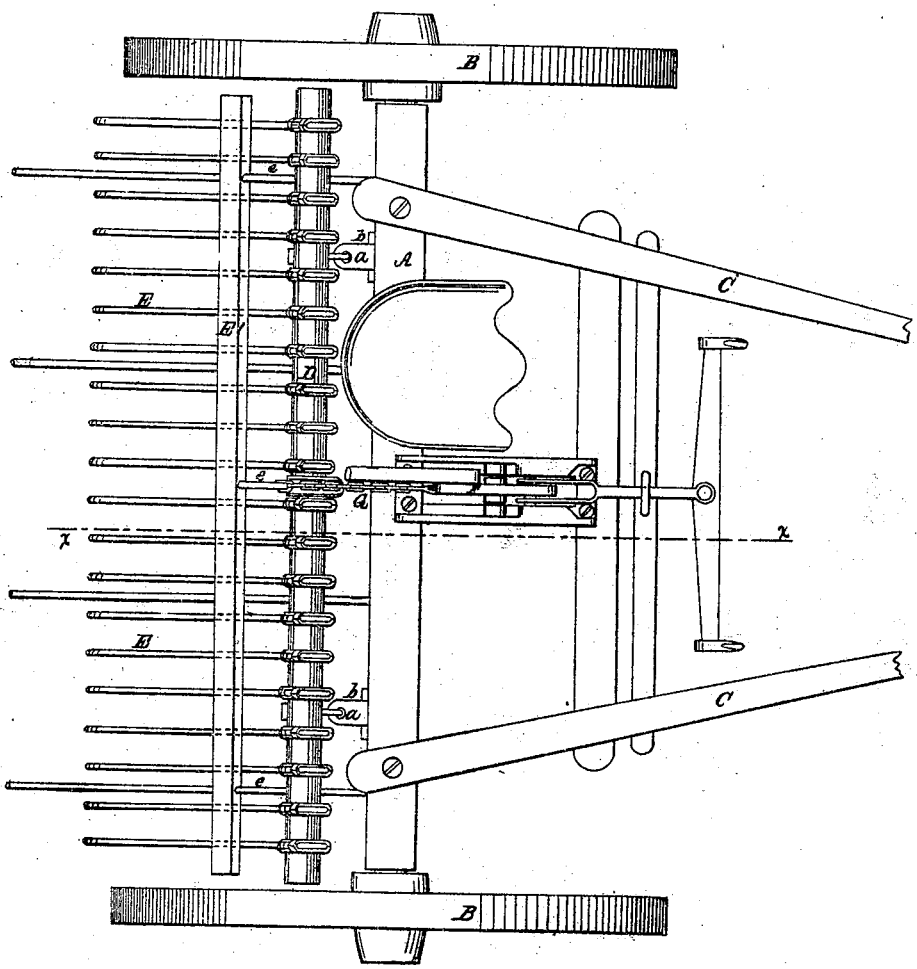

UNITED STATES PATENT OFFICE.

D. P. SHARP, OF ITHACA, NEW YORK.

IMPROVEMENT IN HORSE-RAKES.

Specification forming part of Letters Patent No. 51,486, dated December 12, 1865.

*To all whom it may concern:*

Be it known that I, D. P. SHARP, of Ithaca, in the county of Tompkins and State of New York, have invented a new and Improved Horse-Rake; and I do hereby declare that the following is a full, clear, and exact description thereof, which will enable others skilled in the art to make and use the same, reference being had to the accompanying drawings, forming pa. of this specification, in which—

Figure 1 is a side sectional view of my invention, taken in the line $x$ $x$, Fig. 2; Fig. 2, a plan or top view of the same; Fig. 3, an enlarged transverse section of the rake-head; Fig. 4, a section of Fig. 3, taken in the line $y$ $y$.

Similar letters of reference indicate like parts.

This invention relates to a new and useful improvement in horse-rakes, and of that class in which wire teeth are used.

The invention consists in a novel manner of attaching the teeth to the rake-head, whereby their security is increased without impairing the freedom of their independent action.

A represents an axle having a wheel, B, at each end, and thills C C attached, and D is the rake-head, which is of cylindrical form, and is connected by eyebolts $a$ to brackets $b$ at the rear of the axle, to admit of the rake-head turning freely, in order that the rake-teeth may be raised in order to discharge their load.

E represents the rake-teeth, which are constructed of wire and bent in the usual form. The upper ends of these teeth are curved or bent so as to form a complete circle, of such diameter as to admit of the rake-head D fitting in them. The rake-head has metal plates $c$, attached circumferentially to it at suitable and equal distances apart, and these plates have eyes $d$ formed on them, to serve as guides or sockets for the upper ends of the teeth to work in, and admit of the teeth turning on the rake-head. (See Fig. 3.) The ends of the upper bent or curved portions of the teeth, when the latter are turned to their fullest extent, bear against stops $d'$, attached to the rake-head. These stops limit the turning movement of the teeth on the rake-head in a downward direction, the upward direction being limited by the teeth striking against a bar, E', which is attached to the rake-head by arms $e$. By this means of attaching the teeth to the rake-head an independent movement is allowed each tooth on the rake-head, and at the same time the teeth are all raised simultaneously, in order to discharge their load, in consequence of the stops $d'$ bearing against the upper ends of the teeth when the head D is turned, which is accomplished by means of a lever, F, connected to an arm of the head by a chain, G.

The improvement is extremely simple, and it admits of the teeth being readily attached to and detached from the rake-head, obviates the tendency of the teeth to break or bend under obstructions which may be in their path, and renders the rake more substantial and durable.

Having thus described my invention, I claim as new and desire to secure by Letters Patent—

1. The combination of the eyes or sockets $d$ $d$ $d$ with the metallic plates $c$ and coiled teeth E, all arranged to operate as and for the purposes specified.

2. The stops $d'$, when used in connection with the teeth applied to the rake-head, substantially as and for the purpose specified.

D. P. SHARP.

Witnesses:
WM. L. BOSTWICK,
C. M. TITUS.